INVENTOR.
EARL L. BROWN.
BY
ATTORNEY.

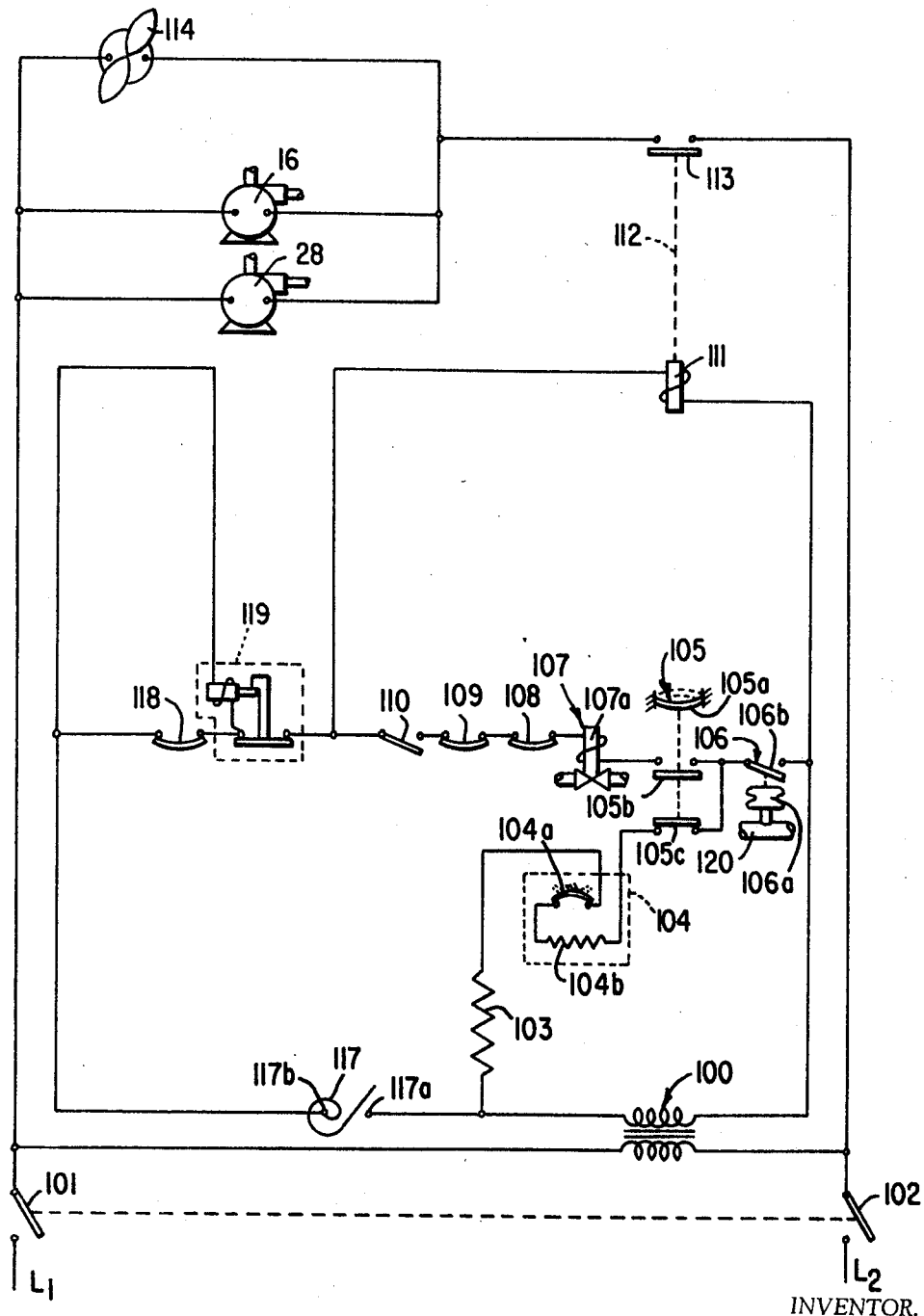

though the refrigerant solu-
United States Patent Office 3,514,965
Patented June 2, 1970

---

3,514,965
REFRIGERATION SYSTEM HAVING GENERATOR TEMPERATURE CONTROL MEANS
Earl L. Brown, Indianapolis, Ind., assignor to Carrier Corporation, Syracuse, N.Y., a corporation of Delaware
Filed Aug. 27, 1968, Ser. No. 755,640
Int. Cl. F25b 15/00
U.S. Cl. 62—148                                            2 Claims

ABSTRACT OF THE DISCLOSURE

A refrigeration system comprised of a generator, solution-cooled absorber, primary absorber, condenser, liquid-suction heat exchanger, and chiller, wherein there is incorporated in the system circuitry embodying temperature responsive switch means located exteriorly of the generator in the vaporous flow path leading therefrom and operable as an auxiliary means to sense abnormally high temperature conditions interiorly of the generator, indicative by way of illustration of a low refrigerant level therein, and effecting through the circuitry provided herein termination, or at least a significant reduction, of fuel input to the generator.

BACKGROUND OF THE INVENTION

It is believed novel in the art to provide in a refrigeration system of the character herein generally disclosed a supplemental or secondary thermally responsive switch mechanism, including circuitry related thereto, constituting a failsafe device which guards against possible malfunctions in the system should the temperature within the generator reach an abnormally high point. This is generally indicative of a low refrigerant level, and is detected in accordance with the concepts of this invention by sensing the temperature of the vapors passing from the generator to the condenser.

Temperature responsive means have of course previously been employed in direct attachment to the generator shell, and have also been connected to the heat transfer surfaces or fins which extend outwardly from the shell. Such means are constructed, normally during the manufacture thereof, to sense a relatively high temperature within the generator, of the order of about 300° F., depending natually upon the chemical composition of the refrigerant selected and other known variables. If the set point of the switch means is exceeded, the electrical circuit of which it is a component is opened, and fuel input to the generator is markedly reduced or even completely terminated.

However, in an air conditioning system of the character contemplated herein, occasions may arise under which the temperature responsive means briefly described immediately above is not activated even tion in the generator is below the optimum level. To explain more fully, it has been found that the pump means controlling flow of refrigerant solution from the primary absorber to the generator may, should the belt thereon become loose or worn, or for other reason be operating at less than the desired efficiency, a lesser volume of solution is returned to the generator. The same result may occur should there be relatively low pump pressure, possibly occasioned by an inadequate amount of cooling air being delivered to the condenser.

In any event, by provision of the secondary limit switch means of this invention, in combination with the other components of the refrigeration system herein disclosed, upon occurrence of any one of the mentioned illustrative conditions fuel input to the generator will be effectively throttled to a safe level and any possibility of damage to the generator and parts directly associated therewith will be eliminated.

SUMMARY OF THE INVENTION

The present invention is directed particularly to a refrigeration system incorporating a generator of shell constuction having in relatively close proximity thereto a heat energy source, the fuel supply for which is under control of primary and secondary limit switch means effective to detect the refrigerant liquid level within the generator by sensing at spaced locations in the system the temperature interiorly of the generator. Preferably, the primary thermally responsive switch means is located in close adjacency to the generator shell, and the secondary thermally responsive switch means is positioned on a line connecting the generator to the condenser. The two mentioned switch means are electrically connected in series, and each has a different temperature actuated set point, the secondary switch means being constructed to detect relatively lower temperatures in the generator than the primary switch means, and by being located in a particularly temperature sensitive portion of the system, the secondary switch responds almost immediately should the liquid refrigerant reach an abnormally low level. The latter switch then opens the electrical circuit to the fuel supply means, and renders remote the possibility of corrosion damage to the generator and the heat transfer surfaces thereon.

BRIEF DESCRIPTION OF THE DRAWINGS

FIG. 2 is a diagram of an exemplary electrical circuit for accomplishing the purposes of the instant invention.

DESCRIPTION OF THE PREFERRED EMBODIMENT

Figure 1:
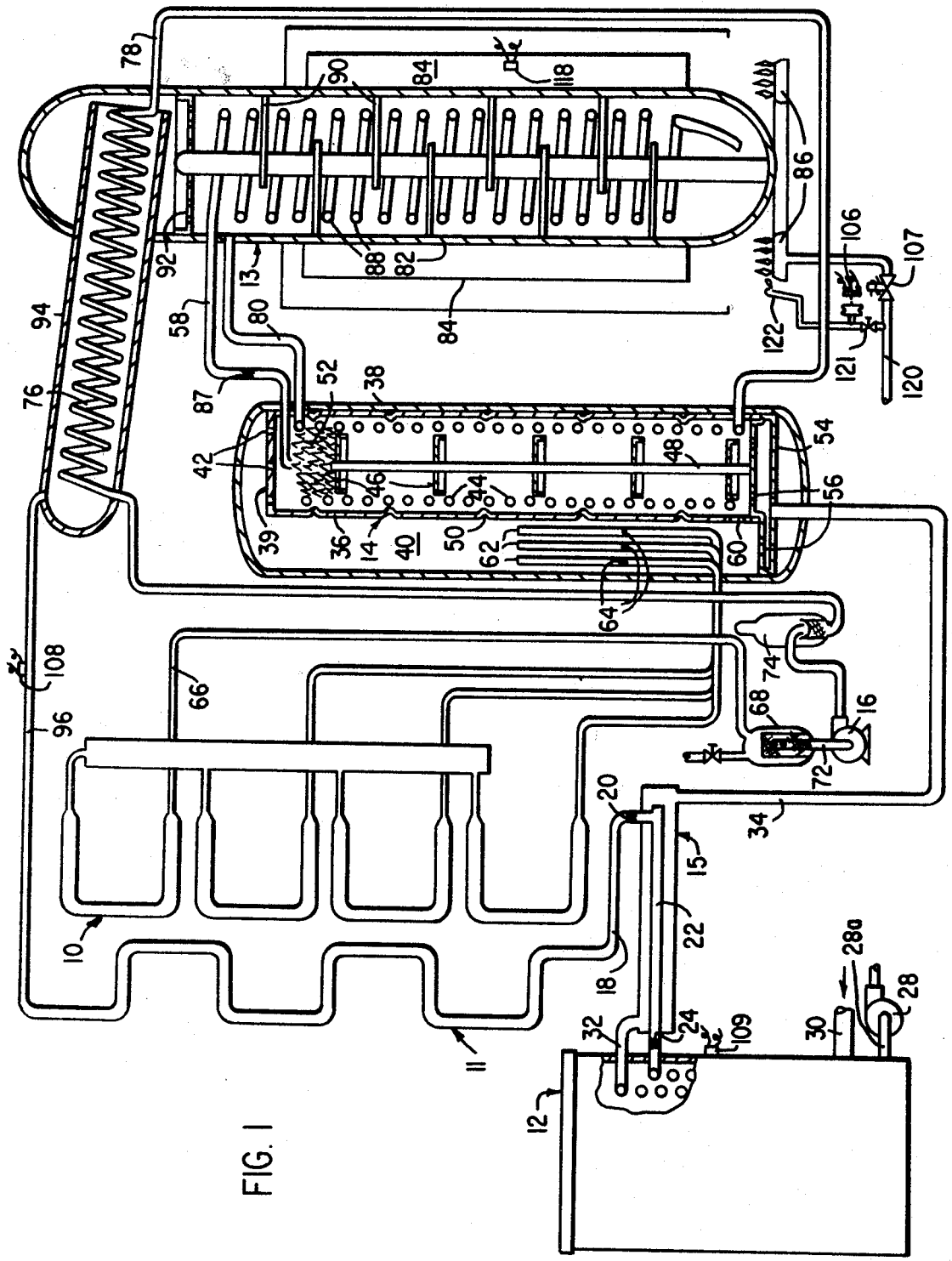
FIG. 1 illustrates schematically, with portions thereof taken in section, a preferred form of air conditioning system incorporating the present invention.

Referring now to the drawings, there is shown in FIG. 1 a refrigeration system comprising a primary absorber 10, a condenser 11, an evaporator or chiller 12, a generator 13, a solution-cooled absorber 14, and a liquid-suction heat exchanger 15 connected to provide a refrigeration cycle. Pump means 16 are employed to circulate weak absorbent solution from the primary absorber 10 to the generator 13. As used herein, the term "weak absorbent solution" refers to a solution which is relatively low in absorbent power, and the expression "strong absorbent solution" designates a solution which is high in absorptive capacity. A suitable absorbent for use in the system described is water, and a desirable refrigerant is ammonia.

Liquid refrigerant condensed in the condenser 11 passes through refrigerant liquid passage 18, and refrigerant restriction 20 to heat exchange tube 22 of the liquid-suction heat exchanger 15. The liquid refrigerant is cooled in the tube 22 and emerges from the liquid-suction heat exchanger and passes through refrigerant restriction 24 into the heat exchanger in the chiller 12.

A fluid medium such as water to be chilled passes over the exterior of the heat exchanger where it is chilled by giving up heat to evaporate refrigerant within the heat exchanger. The chilled medium passes out of the chiller 12 through line 28a under action of pump means 28 to suitable remotely located heat exchangers (not shown), after which it is returned to the chiller through inlet 30 for rechilling.

The cold refrigerant evaporated in the heat exchanger passes through refrigerant vapor passage 32 and through the liquid-suction heat exchanger 15 in heat exchange relation with liquid refrigerant passing through the tube 22. The refrigerant vapor then passes through refrigerant vapor passage 34 into the solution-cooled absorber 14.

The solution-cooled absorber 14 is formed within a substantially tubular or cylindrical vessel 38 exemplified by a tubular and preferably generally cylindrical internal baffle 36 which divides the vessel 38 into the solution-cooled absorber 14 and a second solution chamber 40. The vessel 38 is preferably closed at opposite ends. The baffle 36 may be provided with a cover plate 39 having a plurality of vapor discharge apertures 42 therein which allow vapor to escape from the solution-cooled absorber 14 into the chamber 40.

A weak solution heat exchanger 44, preferably comprising a helical coil, is disposed within the solution-cooled absorber 14. A plurality of horizontally extending plates 46 are suitably secured to a central support member 48 and arranged interiorly of the baffle 36 to cooperate with annular groove 50 and the heat exchanger 44 to provide a tortuous continual flow or passage from vapor and solution through the solution-cooled absorber 14. Suitable packing means, such as Raschig rings 52, may chill the space between the uppermost plate 46 and the top of solution-cooled absorber to reduce the tendency for solution froth to escape through the discharge apertures 42.

A refrigerant vapor distributor header 54 is secured to close the bottom of the baffle 36. The header 54 is provided with refrigerant vapor ports 56 for passage of refrigerant vapor from the line 34 into the solution-cooled absorber 14 and the chamber 40. Strong solution from the generator 13 is admitted to the top portion of the solution-cooled absorber 14 through line 58. The strong solution moves downwardly through the solution-cooled absorber in counter-flow relation with upwardly passing refrigerant vapor and weak solution passing through the coil 44. A strong solution discharge passage 60 is provided adjacent the lower portion of the baffle 36 for movement of solution from the solution-cooled absorber into the chamber 40.

Solution discharge passages 62 are provided for passing a mixture of refrigerant vapor and solution from the chamber 40 to the primary absorber 10. Each of the discharge passages may take the form of a tubular member having an open upper end for admission of vapor and a solution inlet aperture 64 disposed below the level of absorbent solution in the chamber 40. This construction insures a mixed flow of liquid and vapor to the primary absorber.

A cooled medium, preferably ambient air, is passed through the primary absorber 10 in heat exchange relationship with the absorbent solution to cool the same and promote the absorption of the refrigerant vapor in the absorber. The same cooling medium may be supplied to the condenser 11 in heat exchange relationship with refrigerant therein to condense the refrigerant.

Cold weak absorbent solution passes from the primary absorber 10 through line 66 into pump inlet tank 68. Weak solution from the inlet tank 68 is supplied to the weak solution pump 16 through line 72. Liquid from the pump 16 passes through pump discharge tank 74 to a rectifier heat exchange coil 76. From the coil 76 the weak solution moves through line 78 to the weak solution heat exchanger 44 in the solution cooled absorber 14. The weak solution from the coil 44 passes through line 80 into the upper portion of the generator 13 together with any vapor formed in the coil 44.

The generator 13 comprises a shell 82 having fins 84 suitably affixed thereto, as by welding. The generator is heated by a gas burner 86 or any other desired heating means. The weak solution is boiled in the generator 13 to form a strong solution and refrigerant vapor.

The hot strong absorbent solution passes upwardly through the analyzer section of the generator 13 through analyzer coil 88 in heat exchange relationship with the weak solution passing downwardly over the coil 58. The warm strong solution then moves through the line 58, which has a solution restrictor 87 therein, and is then discharged into the upper portion of the solution-cooled absorber 14.

Refrigerant vapor formed in the generator 13 passes upwardly through the analyzer section thereof where it is concentrated by mass transfer with weak solution passing downwardly over the analyzer coil 88. Analyzer plates 90 within the generator 13 provide a tortuous path for flow of solution and vapor to assure intimate contact therebetween and to thus improve the mass transfer. The refrigerant vapor from the analyzer section passes through reflux plate 92 in heat exchange relationship with absorbent condensed in rectifier 94. The vapor is then directed through the rectifier 94 in heat exchange relationship with the rectifier heat exchange coil 76. Absorbent condensed in the rectifier 94 flows downwardly onto the plate 92 where it is heated by the refrigerant vapor passing therethrough. The heated absorbent is then passed to the generator along with the weak solution discharged into the generator from line 80. Vapor is directed through line 96 to the condenser 11 to complete the refrigeration cycle.

The novel circuitry of the present invention as employed in connection with a refrigeration system featuring the structure described above embodies the arrangement appearing in FIG. 2. A suitable source of alternating current (not shown) is adapted to supply current via leads $L_1$ and $L_2$ to energize transformer 100 when contacts 101 and 102 are closed. The transformer is electrically connected to pilot ignition coil 103, which may take the form of a glow coil, leading through a temperature responsive switch assembly generally designated as 104 to pilot operated switch means 105, a line therefrom passing to pressure switch means 106 and solenoid operated gas valve means 107.

The connection from the valve means 107 passes through a secondary limit switch 108 provided for the novel purposes to be later more fully described, a part load switch 109 to a sail switch 110 and through a lead to solenoid means 111 which is also connected, as shown, to the pressure switch means 106. Through suitable insulation means, designated by dotted lines as 112, the solenoid 111 is in control of relay means 113 leading to condenser fan means 114 and the pump means 16 and 28, designated in FIG. 2 by the same numerals as employed in FIG. 1.

To complete the description of the circuitry elements herein provided, the transformer 100 is electrically connected to contact 117a of thermostat 117, when the latter is actuated, and from other contact 117b of the thermostat a lead runs to primary limit switch means 118 and a solenoid operated manual reset device 119, thereby completing the circuit as thus far explained.

In operation of the electrical system conceived for the refrigeration cycle of FIG. 1, the following takes place. Closing of the contacts 101 and 102 from main line leads $L_1$ and $L_2$ energizes the transformer 100 and supplies current to the pilot ignition coil 103 and therefrom to temperature sensitive switch portion 104a through resistor portion 104b of the switch assembly or heat motor 104. Assuming adequate fuel line pressure from main conduit 120 into hand manipulatable valve means 121 (FIG. 1), bellows portion 106a of the pressure switch 106 causes contact member 106b to move from the open position of FIG. 2 to a closed position.

With sufficient fuel pressure in the main line 120 and the pressure switch closed, actuation of the pilot ignition coil 103 and the switch assembly 104 causes pilot gas means 122 (FIG. 1) to ignite, whereupon bimetallic element 105a or its general equivalent forming a part of the pilot operated switch 105 senses the pilot flame and causes contact portion 105b to close and contact portion 105c to simultaneously open. Opening the contact 105c will thus break the sub-circuit through the heat motor 104, and the resistor 104b will cool down.

Should a condition exist in which there is an inadequate supply of heat from the pilot 122, or no pilot flame whatsoever, the bimetallic element 105a of switch means 105 will fail to open the normally closed contact portion 105c.

The ignition glow coil 103 would then remain energized, and after a predetermined time interval as sensed by the heat motor 104, the resistance element 104b thereof will slowly heat the bimetallic contact portion 104a to open the sub-circuit and de-energize the glow coil. Switch portion or resistance element 104b, when the temperature thereof is reduced, will close the contact portion 104a and thus re-energize the pilot ignition circuit.

Assuming now that the thermostat 117 is closed as a result of a requirement for cooling air, electrical energy passes from the transformer 100 through the thermostat 117 and in a dual path across the limit switch 118 and solenoid operated reset device 119 to the solenoid 111, thereby closing the relay 113 to the condenser fan 114 and motors of pump means 16 and 28, causing activation of the last three named elements. The circuit described thus far is of course completed from the transformer 100 to the solenoid 111 following the path shown on the right hand side of the diagram of FIG. 2.

With the compressor fan 114 in operation the sail switch 110 is caused to close and a sub-circuit is activated in one direction from the transformer 100 through the now closed switches 106 and 105 to solenoid portion 107a of the gas valve 107, and in the opposite direction from the transformer through the thermostat, limit switch 118, reset device 119, closed sail switch 110, part load switch 109, secondary limit switch 108 and terminating in the solenoid portion of the gas valve 107. With the pilot 122 ignited in the manner earlier described, actuation of the gas valve by the solenoid 107a causes the main fuel burner 86 to be ignited and the temperature of the refrigerant solution within the generator shell 82 will shortly be elevated to its boiling point to initiate the refrigeration cycle described earlier herein.

While the circuitry described above, and particularly the pressure switch means 106 thereof, have proven themselves to be effective in accomplishing the objectives for which they were designed, the provision of the secondary limit switch means 108 of this invention, which supplements the function of the primary limit switch means 118, there is produced significant additional advantages. More specifically, even though the pressure switch means adequately responds to fluctuations in fuel line pressures, and thereby controls fuel input to the generator, it is particularly important that the temperature conditions interiorly of the generator be accurately sensed in a location especially responsive to the temperature of the vapors passing from the generator 13 through the line 96 to the condenser 11.

As was indicated earlier, assuming normal operation of the refrigeration system of FIGS. 1 and 2, and with particular reference to the circuitry diagram of FIG. 2, normal operation causes the contact portion 104a of the heat motor 104 to be opened, contact 106b of the pressure switch will be closed, sail switch 110 will close upon energization of the fan 114 when the thermostat 117 is closed. A sub-circuit will thereby be completed through the normally closed primary limit switch 118, manual reset relay 119, the sail switch 110, which was closed by action of the fan 114, and through the normally closed part load switch 109 and secondary limit switch means 108 to the gas valve 107.

However, upon occasion the pump means 16 may not function with the efficiency desired for the reasons earlier noted, and the other described situations may occur. Under these circumstances, when the solution within the generator approaches a level causing boiling in excess of a temperature of about 300° F., the primary limit switch means 118 will be triggered. This, however, has been found not to be sufficient as a precautionary measure when the system returns sufficient weak absorbent solution to the generator to maintain the desired solution level therein and thus the primary switch means may not be activated. In other words, the solution level may be adequate in this situation to sustain boiling and thus not trigger the primary switch 118. Nevertheless, the temperature of the vapors emitted may be sufficiently high to cause corrosion damage to the upper region of the generator and the heat transfer surfaces thereon.

Accordingly, there is incorporated in the line or conduit 96 leading from the generator 13 to the condenser 11 through the rectifier 94 secondary limit switch means 108, electrically connected in the manner appearing in FIG. 2. The switch 108 is pre-set to be activated to an open position at a temperature lower than that of the primary limit switch 118, as for example, about 175° F. in contrast to 300° F. for the latter switch. In this manner, under the conditions stated above, the secondary switch 108 will open, and thereby provides a fail-safe device for the entire system.

It is believed manifest from the foregoing that the circuitry of this invention, comprising the elements disclosed arranged as shown, effectively precludes the possibility of corrosion or like damage to the generator and components thereof. The secondary limit switch 108 in most cases will completely deactivate the refrigeration system under those described conditions not sensed by the primary limit switch 118. An additional measure of safety is thereby provided to the system, and its opening efficiency markedly enhanced.

Numerous modifications may of course be practiced in the arrangement herein disclosed, including a different positioning of the secondary limit switch means, without departing from the spirit of the invention or the scope of the subjoined claims.

I claim:

1. In a refrigeration system having a generator, an absorber, a condenser, an evaporator, conduit means connecting said generator to said condenser, combustion means for heating refrigerant solution within said generator to cause vapors to be evolved therefrom, means for supplying fuel to said combustion means, and primary temperature responsive means electrically connected to said fuel supply means and directly associated with said generator for detecting the temperature of the solution within said generator and effective to control said fuel supply means when the temperature interiorly of said generator substantially exceeds the boiling point of said solution, the improvement which comprises secondary temperature responsive means electrically connected to said primary temperature responsive means and said fuel supply means and located to sense the temperature of the vapors passing from said generator to said condenser at a temperature substantially lower than that sensed by said primary means, whereby any possibility of overheating of the refrigerant within said generator is avoided and the possibility of consequent corrosion damage thereto is essentially eliminated.

2. A refrigeration system of the character defined in claim 1, in which a rectifier is located between said generator and said condenser, and said conduit means is in connecting relationship to said generator, rectifier and condenser, and in which the secondary temperature responsive means is directly connected to said conduit means.

References Cited

UNITED STATES PATENTS

| 2,298,924 | 10/1942 | Bichowsky | 62—148 |
| 3,262,282 | 7/1966 | Aronson | 62—476 X |
| 3,296,814 | 1/1967 | Lynch et al. | 26—476 X |
| 3,452,551 | 7/1969 | Aronson | 62—148 |

LLOYD L. KING, Primary Examiner

UNITED STATES PATENT OFFICE
CERTIFICATE OF CORRECTION

Patent No. 3,514,965     Dated June 2, 1970

Inventor(s)  EARL L. BROWN

It is certified that error appears in the above-identified patent and that said Letters Patent are hereby corrected as shown below:

Column 1, line 60, after "for" insert --some--.

Column 3, line 17, for "from" read --for--.

Column 6, line 27, for "opening" read --operating--.

Signed and sealed this 11th day of May 1971.

(SEAL)
Attest:

EDWARD M. FLETCHER, JR.
Attesting Officer

WILLIAM E. SCHUYLER, JR.
Commissioner of Patents